US012554809B2

(12) United States Patent
Starin et al.

(10) Patent No.: US 12,554,809 B2
(45) Date of Patent: Feb. 17, 2026

(54) INFRARED LIGHT-BASED AUTHENTICATION

(71) Applicant: Bank of America Corporation, Charlotte, NC (US)

(72) Inventors: Jason Starin, Huntersville, NC (US); Carrie Elaine Gates, Livermore, CA (US)

(73) Assignee: Bank of America Corporation, Charlotte, NC (US)

( * ) Notice: Subject to any disclaimer, the term of this patent is extended or adjusted under 35 U.S.C. 154(b) by 176 days.

(21) Appl. No.: 18/386,044

(22) Filed: Nov. 1, 2023

(65) Prior Publication Data

US 2025/0139210 A1 May 1, 2025

(51) Int. Cl.
*G06F 21/31* (2013.01)
(52) U.S. Cl.
CPC .................... *G06F 21/31* (2013.01)
(58) Field of Classification Search
CPC .................................................... G06F 21/31
See application file for complete search history.

(56) References Cited

U.S. PATENT DOCUMENTS

| 9,152,850 | B2 | 10/2015 | Mogi | |
|---|---|---|---|---|
| 10,082,664 | B2 | 9/2018 | Smits | |
| 10,121,073 | B2 | 11/2018 | Smits | |
| 11,341,764 | B2 | 5/2022 | Bhat et al. | |
| 11,379,441 | B1* | 7/2022 | Schmidt | G06F 16/215 |
| 2006/0005022 | A1* | 1/2006 | Wakamori | G07C 9/37 713/168 |
| 2022/0237225 | A1* | 7/2022 | Takamura | G06T 7/0004 |

* cited by examiner

*Primary Examiner* — Pramila Parthasarathy
(74) *Attorney, Agent, or Firm* — Banner & Witcoff, Ltd.

(57) ABSTRACT

Arrangements for authenticating users using infrared light are provided. A computing platform may detect an initiated video communication session between two or more computing devices. In response, a prompt to initiate authentication via an infrared authentication device may be transmitted to at least one computing device. The computing platform may receive, from the at least one computing device, image data captured by an image capture device of the at least one computing device which may include infrared light reflected off a user. The computing platform may analyze the image data to generate an authentication output based on the infrared light reflected off the user. A notification of the authentication output may be transmitted to the at least one computing device and, if the authentication output indicates the user is not authenticated, the computing platform may transmit a command or instruction causing the communication session to terminate.

20 Claims, 11 Drawing Sheets

INFRARED LIGHT-BASED AUTHENTICATION

BACKGROUND

Aspects of the disclosure relate to electrical computers, systems, and devices for using infrared light-based authentication.

The development and increased use of generative artificial intelligence has led to the ability for unauthorized users to replicate a user's image or likeness on a screen. This can be used to obtain information from users. For instance, artificial intelligence generated images may be used in a video communication session to obtain personal, private or confidential information from other users in the video communication session. Accordingly, it would be advantageous to authenticate a user to a video communication session and confirm that the user is, in fact, a human user and not an artificial intelligence generated imposter.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with authenticating users to video communication sessions.

In some examples, a computing platform may detect an initiated communication session between two or more computing devices. In some examples, the communication session may be a video call, video conference, or other video-based communication session. In response to detecting the communication session, a prompt to initiate authentication via an infrared authentication device may be transmitted to at least one computing device.

The computing platform may receive, from the at least one computing device, image data captured by an image capture device of the at least one computing device. In some examples, the image data may include infrared light reflected off a cornea of a user associated with the at least one computing device. The computing platform may analyze the image data to generate an authentication output based on the infrared light reflected off the cornea of the user. If the authentication output indicates the user is authenticated, the computing platform may generate and transmit a notification of authentication to the at least one computing device. If the authentication output indicates the user is not authenticated, the computing platform may generate and transmit a notification indicating the user is not authenticated, as well as a command or instruction causing the communication session to terminate.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
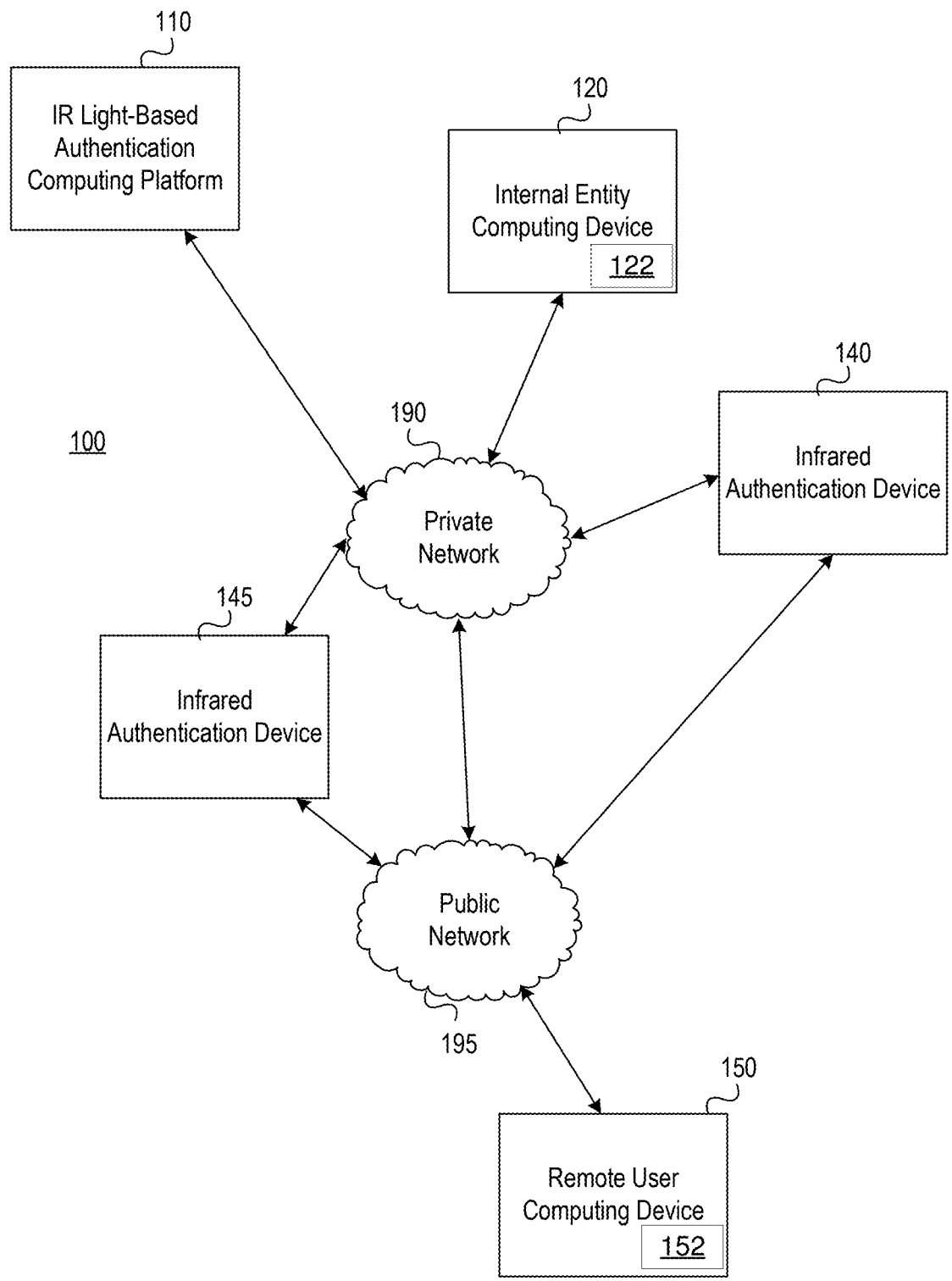
FIGS. 1A and 1B depict an illustrative computing environment for infrared light-based authentication in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, generative artificial intelligence is being used to impersonate people in order to obtain private, confidential or personal information. Accordingly, authenticating users, particularly during a call, such as a video call, and confirming that the user is an actual human user is becoming increasingly more important. Aspects described herein are related to using infrared (IR) light-based authentication to authenticate users during a video communication session.

For instance, while infrared light cannot be seen by the human eye, it can be captured using various image capture devices, such as a charge-coupled device (CCD). A user or computing device may have a camera including a CCD chip or sensor in use for a video communication session. The CCD camera may then interpret the IR light as a series of pixels, with each pixel assigned a color. The corresponding computing device may then "see" infrared light that is converted as a white color on a screen to recognize the presence of an object (e.g., an authenticate code, or the like). Accordingly, infrared diodes (i.e., IR light emitting diodes) could project a series of characters that may be reflected off, for instance, a cornea of a user, and interpreted by the computing device and the CCD camera.

Aspects described herein use an infrared authenticator device including a plurality of IR LEDs to project light, an authentication code, or the like, onto a cornea of a user (e.g., a user may be instructed to project the IR light from the infrared authentication device toward an eye, a particular eye (e.g., left or right), or the like) while being viewed by a camera associated with a video communication session. The reflection of the IR light may be captured by the camera or other image capture device and may be analyzed by a computing platform to determine whether the reflected IR light matches expected patterns, variations, codes, or the like. The user may then be authenticated based on the results of the analysis.

The arrangements described herein enable authentication of a user and confirmation of the user as an actual human user. For instance, artificial intelligence generated images, such as deep fakes, would not follow provided instructions to project the IR light onto a particular eye. Further, even if the IR light was reflected by the artificial intelligence generated image, the topography of the reflected light would not match a topography of light reflected off, for instance, a human cornea, which is unique to the user, has variations, may include changes due to growth or injury, or the like. Accordingly, the aspects described herein provide reliable arrangements for authenticating users during a video communication session and confirming that the user is an actual human user.

These and various other arrangements will be discussed more fully below.

Figure 1B:
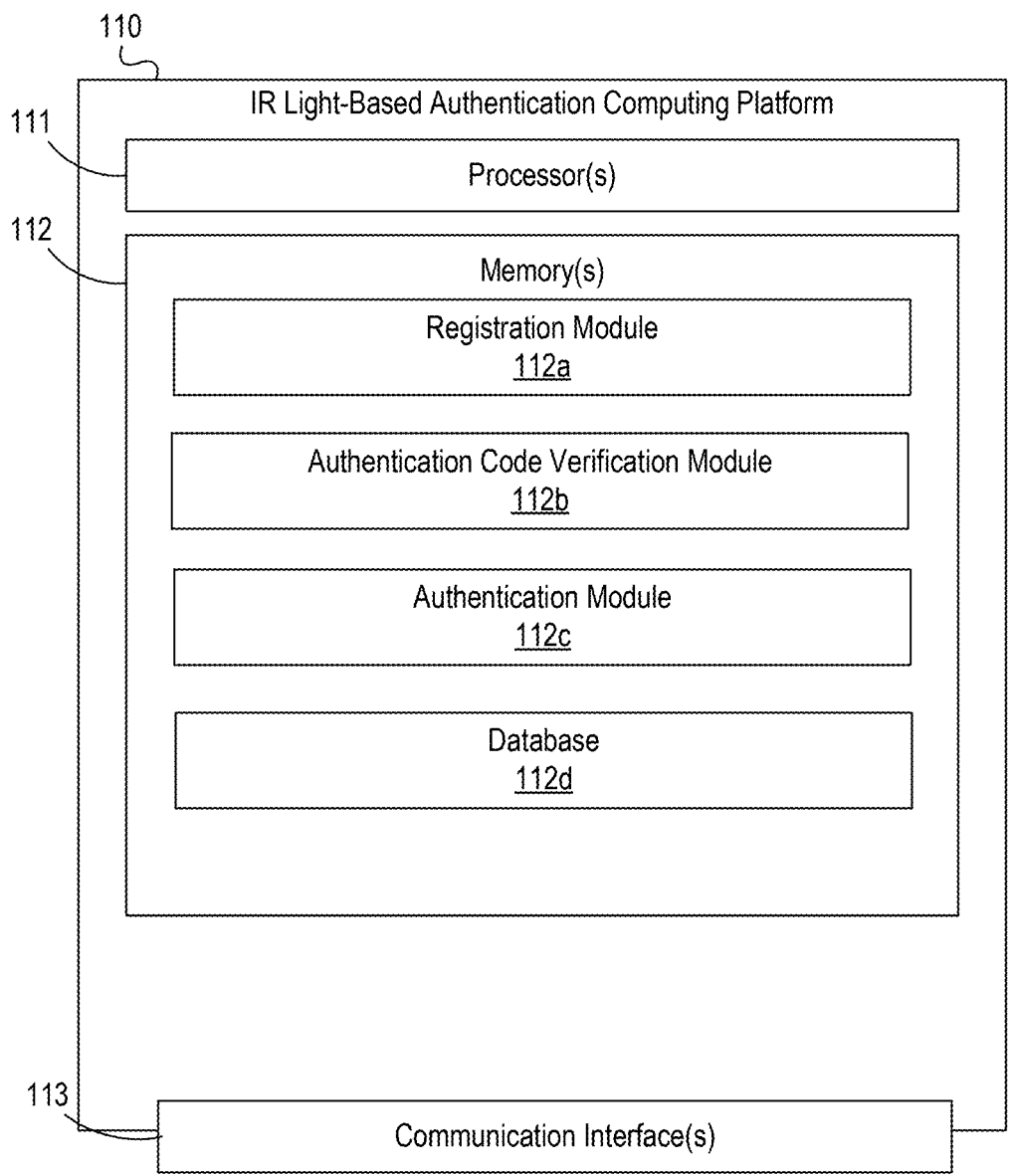

Aspects described herein may be implemented using one or more computing devices operating in a computing environment. For instance, FIGS. 1A-1B depict an illustrative computing environment for implementing infrared (IR) light-based authentication in accordance with one or more aspects described herein. Referring to FIG. 1A, computing environment 100 may include one or more computing devices and/or other computing systems. For example, computing environment 100 may include IR light-based authentication computing platform 110, internal entity computing device 120, infrared authentication device 140, infrared authentication device 145, and remote user computing device 150. Although one internal entity computing device 120, two infrared authentication devices 140, 145 and one remote user computing device 150, are shown, any number of systems or devices may be used without departing from the invention.

IR light-based authentication computing platform 110 may be configured to perform intelligent, dynamic, and efficient real-time authentication of user based on reflected IR light. For instance, IR light-based authentication computing platform 110 may detect an initiated call between one or more computing devices, such as internal entity computing device 120 and remote user computing device 150. Although the examples described include a call between one internal device and one external device, the calls may be between more than two devices, between devices that are all internal to the enterprise organization, between devices all external to the enterprise organization, or the like, without departing from the invention. In some examples, the call may be a video call, conference or other video-based communication session in which an image capture device may be used.

IR light-based authentication computing platform 110 may, based on the detected call, generate prompts for IR light-based authentication and may send the prompts to devices associated with the initiated call. IR light-based authentication computing platform 110 may then request, from an infrared authentication device associated with each user associated with a respect device that is party to the call, authentication data indicating a type of authentication expected to be captured by each respective computing device that is party to the call.

The various computing devices (e.g., internal entity computing device 120 and/or remote user computing device 150) may capture a reflection of IR light projected onto an eye of a user. The reflection may be captured via an image capture device associated with each computing device that may be a charge-coupled device (CCD). The captured data may be received by IR light-based authentication computing platform 110 and analyzed to determine whether the user is authenticated, whether the user is an actual human user or an artificial intelligence-based imposter such as a deep fake, or the like. IR light-based authentication computing platform 110 may generate an authentication response based on the analysis and may send the authentication response to a respective computing device.

Internal entity computing device 120 may be or include one or more user computing devices (e.g., smart phones, wearable devices, laptops, desktops, tablets, or the like) that may be used by a user internal to the enterprise organization. For instance, internal entity computing device 120 may be a computing device associated with and/or used by an employee of the enterprise organization. Internal entity computing device 120 may be configured to initiate and/or conduct communication sessions with one or more other computing devices such as via one or more applications for conducting video-based communication sessions (e.g., video calls, video conferences, or the like).

Internal entity computing device 120 may include an image capture device 122. The image capture device 122 may be a charge-coupled device (CCD) configured to captured reflected infrared light (e.g., IR light reflected by, for instance, a cornea of a user onto which the IR light is projected by an authentication device).

Authentication device 140 and/or authentication device 145 may be or include one or more devices configured to project infrared light (e.g., from a light source in authentication device 140, 145). Each of authentication device 140 and authentication device 145 may be associated with a respective user in order to provide infrared-based authentication functionality to the user. In response to receiving a prompt for infrared-based authentication, the user may use authentication device 140 or authentication device 145 to project IR light onto a cornea of the user. In some examples, the prompt may indicate which eye (e.g., left or right) should be used. In some examples, the authentication device 140, 145 may include a code, such as a randomly generated code, sequential code and associated counter or timer device, rotating code, or the like, that may be projected, via IR light, onto the cornea of the user for reflection. A corresponding computing device may then capture the reflection and analyze it to authenticate the user. In some examples, authentication device 140 and/or authentication device 145 may be configured to communicate with IR light-based authentication computing platform 110 to provide an indication of a type of IR light-based authentication being used (e.g., reflection of light off cornea to evaluate patterns or expected variations, reflection of light including code off cornea to authenticate, or the like). In some examples, the code or a counter or timer setting may be transmitted to the IR light-based authentication computing platform 110 to be used in the authentication process.

Authentication device 140 and/or authentication device 145 may be internal devices or external devices and, accordingly, may connect via private network 190 or public network 195.

Remote user computing device 150 may be or include one or more user computing devices (e.g., smart phones, wearable devices, laptops, desktops, tablets, or the like) that may be used by a user external to the enterprise organization who is authenticating via IR light. For instance, remote user computing device 150 may be a computing device associated with and/or used by a customer, vendor, or the like of the enterprise organization. Remote user computing device 150 may be configured to initiate and/or conduct communication sessions with one or more other computing devices such as via one or more applications for conducting video-based communication sessions (e.g., video calls, video conferences, or the like).

Remote user computing device 150 may include an image capture device 152. The image capture device 152 may be a charge-coupled device (CCD) configured to captured reflected infrared light (e.g., IR light reflected by, for instance, a cornea of a user onto which the IR light is projected by an authentication device).

As mentioned above, computing environment 100 also may include one or more networks, which may interconnect one or more of IR light-based authentication computing platform, internal entity computing device 120, authentication device 140, authentication device 145, and/or remote user computing device 150. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, IR light-based authentication computing platform, internal entity computing device 120, authentication device 140, and/or authentication device 145, may be associated with an enterprise organization (e.g., a financial institution), and private network 190 may be associated with and/or operated by the organization, and may include one or more networks (e.g., LANs, WANs, virtual private networks (VPNs), or the like) that interconnect IR light-based authentication computing platform, internal entity computing device 120, authentication device 140, and/or authentication device 145, and one or more other computing devices and/or computer systems that are used by, operated by, and/or otherwise associated with the organization. Public network 195 may connect private network 190 and/or one or more computing devices connected thereto (e.g., IR light-based authentication computing platform, internal entity computing device 120, authentication device 140, authentication device 145) with one or more networks and/or computing devices that are not associated with the organization. For example, authentication device 140, authentication device 145, and/or remote user computing device 150 might not be associated with an organization that operates private network 190 (e.g., because authentication device 140, authentication device 145, and/or remote user computing device 150 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect authentication device 140, authentication device 145, and/or remote user computing device 150 private network 190 and/or one or more computing devices connected thereto (e.g., IR light-based authentication computing platform, internal entity computing device 120, authentication device 140, authentication device 145, or the like).

As indicated above, authentication device 140 and/or authentication device 145 may be internal devices (e.g., connected via private network 190) or external devices (e.g., connected via public network 195) without departing from the invention. Accordingly, the authentication devices 140, 145 are described above as being either internal or external.

Referring to FIG. 1B, IR light-based authentication computing platform 110 may include one or more processors 111, memory 112, and communication interface 113. A data bus may interconnect processor(s) 111, memory 112, and communication interface 113. Communication interface 113 may be a network interface configured to support communication between IR light-based authentication computing platform 110 and one or more networks (e.g., private network 190, or the like). Memory 112 may include one or more program modules having instructions that when executed by processor(s) 111 cause IR light-based authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of IR light-based authentication computing platform 110 and/or by different computing devices that may form and/or otherwise make up IR light-based authentication computing platform 110.

For example, memory 112 may have, store and/or include registration module 112a. Registration module 112a may have or include instructions that may cause or enable IR light-based authentication computing platform 110 to receive a request to register with the IR light-based authentication computing platform 110. The request to register may include user identifying information (e.g., name, unique identification number, or the like), user contact information, user device identifiers, or the like. In some examples, in response to requesting registration, a user may receive an IR authentication device, such as IR authentication device 140. The IR authentication device may be associated with the registered user and an identifier of the IR authentication device 140 may be stored with the user registration data. In some examples, the registration information may include a baseline image of IR light reflected off a user (e.g., off a cornea of a user) that may be compared to later received reflections to authenticate the user.

IR light-based authentication computing platform 110 may further have, store and/or include authentication code verification module 112b. Authentication code verification module 112b may store instructions and/or data that may cause or enable the IR light-based authentication computing platform 110 to receive a captured image (e.g., video image, still image, or the like) of reflected IR light from a user being authenticated via an IR authentication device 140. For instance, a user may authenticate to a video communication session by directing IR light toward their eye. A reflection of the IR light off the cornea of the eye may be captured and analyzed to authenticate the user. For instance, the IR light may include a sequential or random code that is communicated from the IR authentication device 140 to the authentication code verification module 112b. The captured reflection may be compared to the expected code to authenticate the user, confirm that the user is a human user and not an artificial intelligence impersonation of the user, or the like.

IR light-based authentication computing platform 110 may further have, store and/or include authentication module 112c. Authentication module 112c may store instructions and/or data that may cause or enable the IR light-based authentication computing platform 110 to receive an output from the authentication code verification module 112b and output an authentication instruction. For instance, if the user is authenticated, the authentication module 112c may generate and transmit a notification to one or more parties to the video call that the user is authenticated and the call may continue. Alternatively, if the user is not authenticated, the authentication module 112c may generate an instruction causing the video call to be terminated, to disconnect the user not authenticated, or the like. In some examples, the video call may be paused while one or more users are authenticated, users may be authenticated prior to joining the call or joining others on the call, or the like.

IR light-based authentication computing platform 110 may further have, store and/or include database 112d. Database 112d may store data associated with registered users, IR authentication devices, historical authentication output, and/or other data used by IR light-based authentication computing platform 110.

FIGS. 2A-2E depict one example illustrative event sequence for implementing IR light-based authentication in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
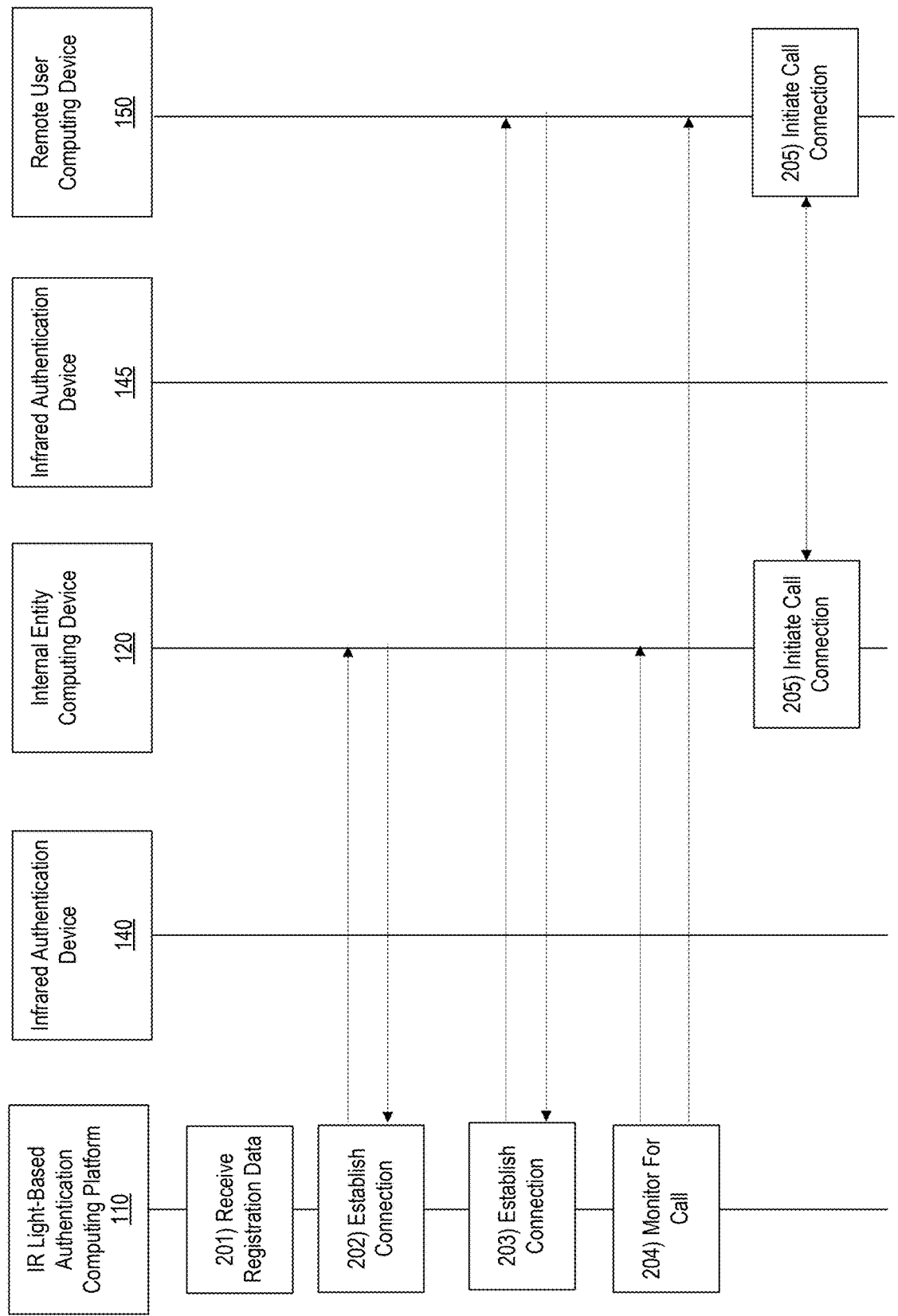
FIGS. 2A-2E depict an illustrative event sequence for infrared light-based authentication in accordance with one or more aspects described herein.

With reference to FIG. 2A, at step 201, registration data may be received from one or more users. For instance, users may request to register for IR light-based authentication and may provide registration data such as name, unique user identifier, account data, user device identifying data, and the like. In some examples, in response to the request to register, each user may be given an infrared authentication device, such as infrared authentication device 140. Data associated with an infrared authentication device 140 sent to each user may be recorded and stored with the registration data received from the user. Accordingly, a respective infrared authentication device 140 may be associated with a particular user and/or user device.

At step 202, IR light-based authentication computing platform 110 may establish a connection with internal entity computing device 120. For instance, a first wireless connection may be established between IR light-based authentication computing platform 110 and the internal entity computing device 120. Upon establishing the first wireless connection, a communication session may be initiated between IR light-based authentication computing platform 110 and internal entity computing device 120. In some examples, IR light-based authentication computing platform 110 may determine that a connection already exists. If so, an additional connection might not be established.

At step 203, IR light-based authentication computing platform 110 may establish a connection with remote user computing device 150. For instance, a second wireless connection may be established between IR light-based authentication computing platform 110 and remote user computing device 150. Upon establishing the second wireless connection, a communication session may be initiated between IR light-based authentication computing platform 110 and remote user computing device 150. In some examples, IR light-based authentication computing platform 110 may determine that a connection already exists. If so, an additional connection might not be established.

At step 204, based on the connections to the internal entity computing device 120 and remote user computing device 150, IR light-based authentication computing platform 110 may monitor each device for initiation of a video conference, call or other communication session. For instance, IR light-based authentication computing platform 110 may monitor traffic on registered devices to detect initiation of a video call in order to implement IR light-based authentication.

At step 205, one or more of internal entity computing device 120 and/or remote user computing device 150 may initiate a call. For instance, one or more of internal entity computing device 120 and/or remote user computing device 150 may initiate a call with the other of internal entity computing device 120 or remote user computing device 150. Additionally or alternatively, one or more of internal entity computing device 120 and/or remote user computing device 150 may join a call (e.g., an established or scheduled video conference).

Figure 2B:
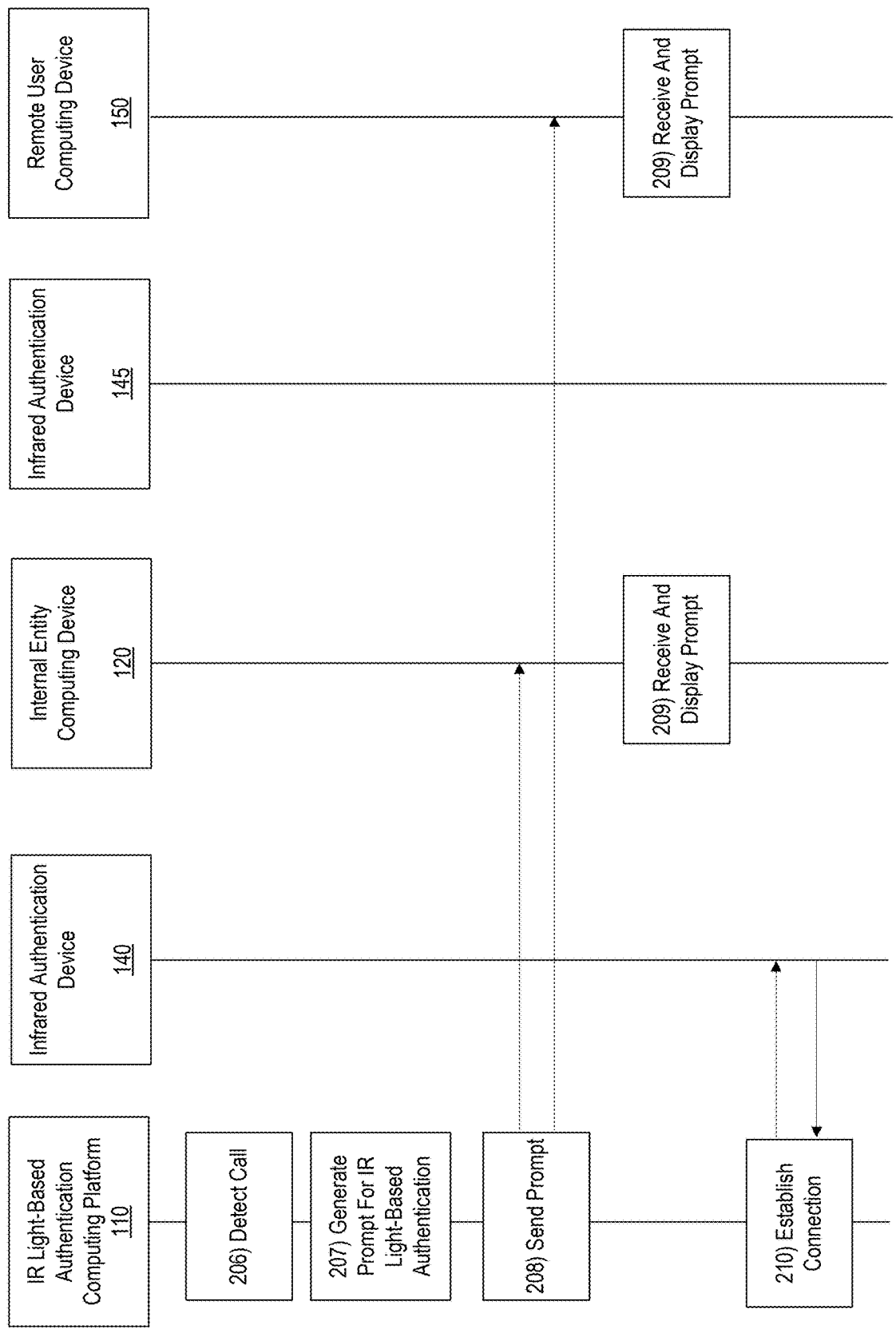

With reference to FIG. 2B, at step 206, the IR light-based authentication computing platform 110 may detect the call initiated by one or more of internal entity computing device 120 and/or remote user computing device 150.

Figure 3:
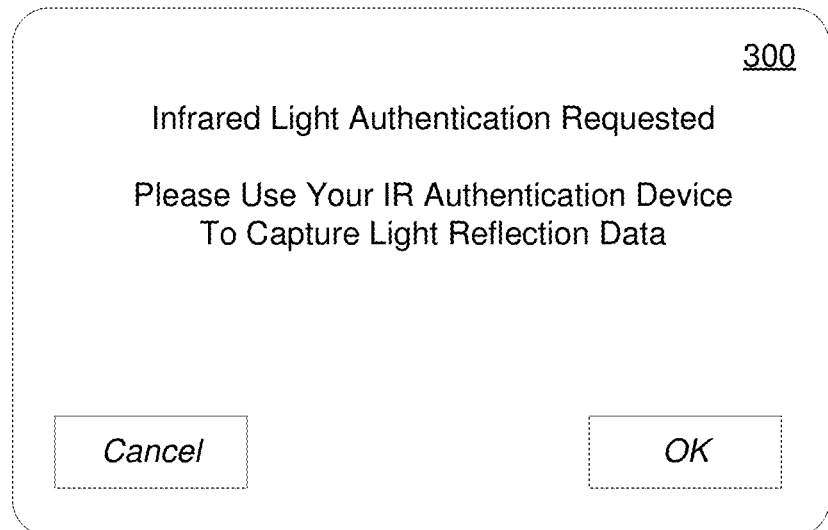
FIGS. 3-5 illustrate example user interfaces that may be generated in accordance with one or more aspects described herein.

In response to detecting a call at step 206, at step 207, IR light-based authentication computing platform 110 may generate a prompt for IR light-based authentication. For instance, IR light-based authentication computing platform 110 may generate a user interface such as interface 300 shown in FIG. 3. The interface 300 includes an indication that IR light-based authentication is requested and instructs the user to use the infrared authentication device 140 to reflect the IR light and/or projected data for capture. The user may select "OK" to proceed with the IR light-based authentication or "CANCEL" to terminate the call or authenticate using one or more other methods.

At step 208, IR light-based authentication computing platform 110 may transmit or send the prompt generated at step 207 to one or more of internal entity computing device 120 and/or remote user computing device 150. In some examples, transmitting or sending the prompt may cause the internal entity computing device 120 and/or the remote user computing device 150 to display the prompt on a display of the respective computing device.

At step 209, internal entity computing device 120 and/or remote user computing device 150 may receive and display the prompt transmitted or sent by the IR light-based authentication computing platform 110.

At step 210, IR light-based authentication computing platform 110 may establish a connection with infrared authentication device 140. For instance, a third wireless connection may be established between IR light-based authentication computing platform 110 and infrared authentication device 140. Upon establishing the third wireless connection, a communication session may be initiated between IR light-based authentication computing platform 110 and infrared authentication device 140. In some examples, IR light-based authentication computing platform 110 may determine that a connection already exists. If so, an additional connection might not be established.

In some examples, infrared authentication device 140 may be associated with a user associated with internal entity computing device 120. Accordingly, the user may use the infrared authentication device 140 to authenticate via the internal entity computing device 120.

Figure 2C:
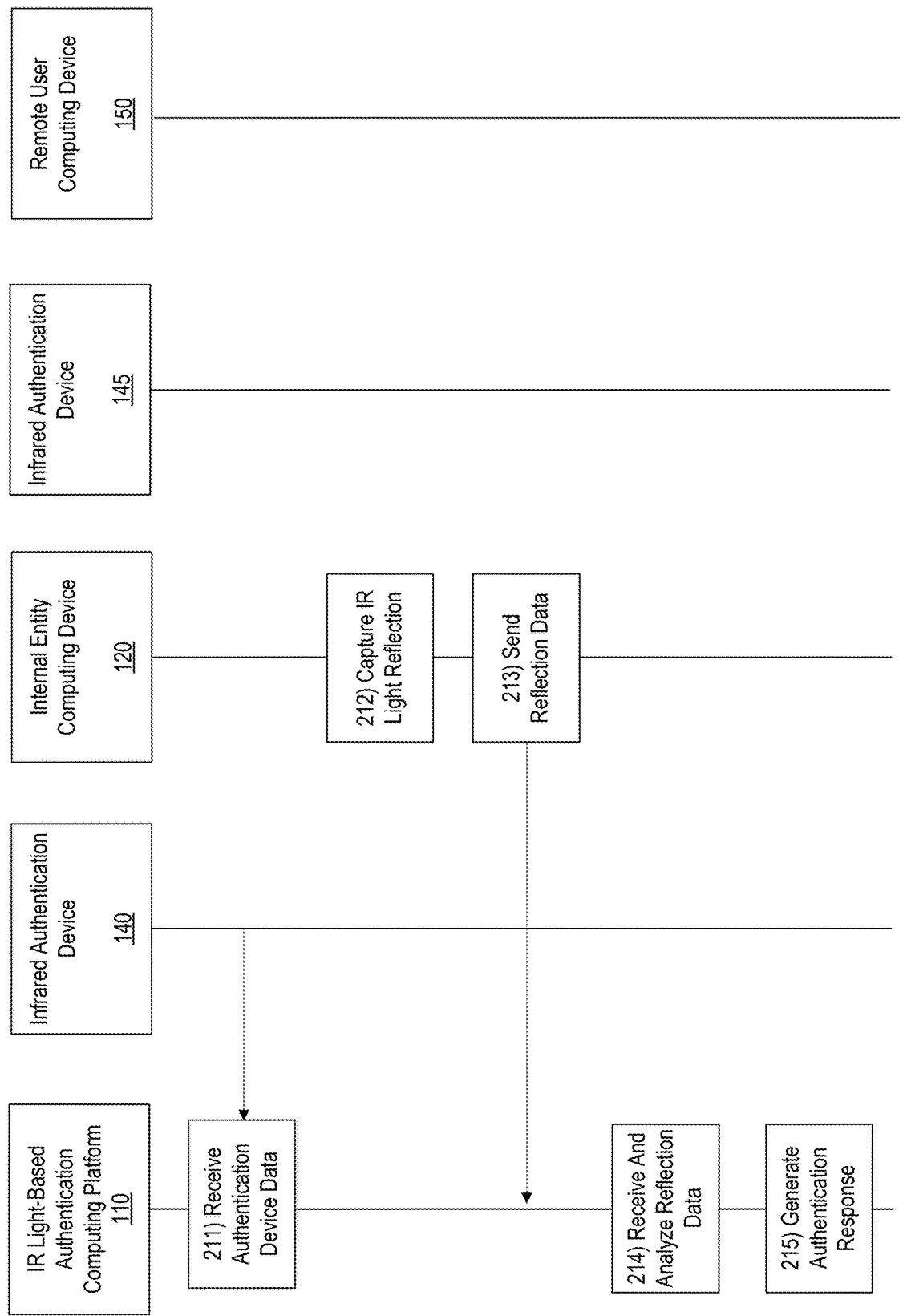

With reference to FIG. 2C, at step 211, IR light-based authentication computing platform 110 may receive, from the infrared authentication device 140, authentication device data. For instance, IR light-based authentication computing platform 110 may receive an indication of a type of IR light-based authentication being used (e.g., IR light reflected off cornea of user and captured via image capture device, IR light including a code reflected off cornea, or the like). Accordingly, the IR light-based authentication computing platform 110 may receive the indication and initiate authentication functions based on the type of IR light-based authentication being used. In one example, the authentication device data received in step 211 may include IR light reflected off a cornea of a user and captured via an image capture device.

At step 212, internal entity computing device 120 may capture the reflected IR light. For instance, an image capture device 122 of the internal entity computing device 120 may include a charge-coupled device configured to capture the reflected image from a cornea of a user receiving a projection of IR light from the infrared authentication device 140.

At step 213, internal entity computing device 120 may transmit or send the captured reflected IR light to the IR light-based authentication computing platform 110.

At step 214, IR light-based authentication computing platform 110 may receive and analyze the captured reflected IR light. For instance, IR light-based authentication computing platform 110 may analyze the captured reflected IR light to determine whether the reflected light matches an expected pattern or image (e.g., an image captured during a registration process of a user). In other examples, IR light-based authentication computing platform 110 may analyze the captured reflected IR light to determine whether there are expected variations, depth, or the like, associated with a human cornea (e.g., to confirm that the user is a human user and not an artificial intelligence-based imposter).

Figure 4:
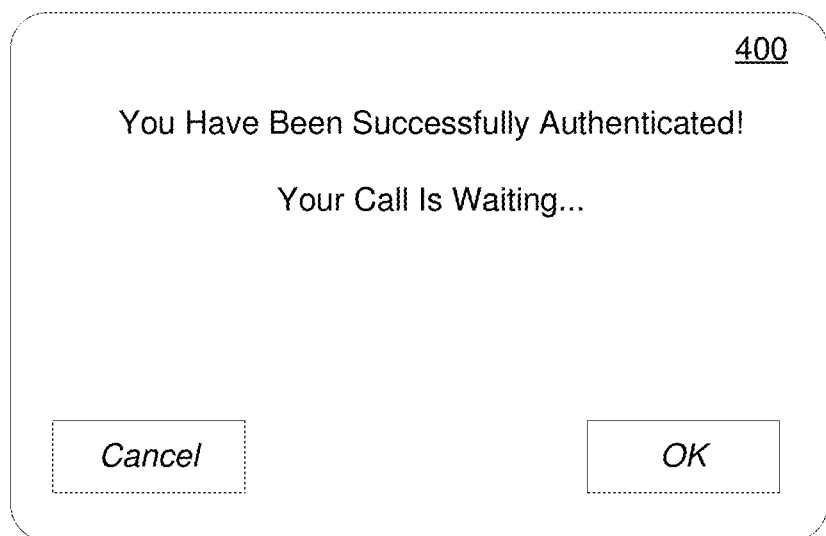

At step 215, based on the analyze captured reflected IR light, IR light-based authentication computing platform 110 may generate an authentication response. For instance, if the analysis confirms the user is an actual human user or that the reflected light matches one or more patterns expected for the user, the user may be authenticated and IR light-based authentication computing platform 110 may generate an authentication response indicating that the user is authenticated and the initiated call may continue. For instance, FIG. 4 illustrates one example user interface 400 including an indication that the user was successfully authenticated and the call may continue.

Figure 5:
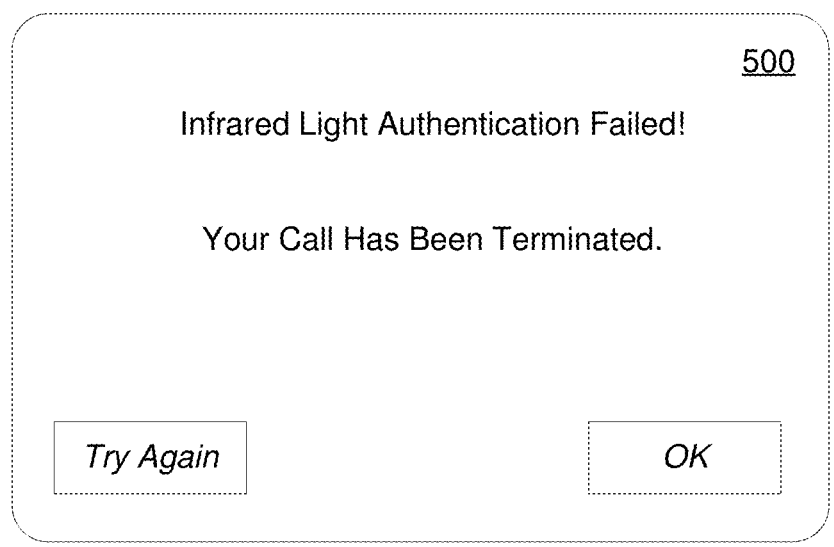

Alternatively, if the reflected pattern does not match an expected pattern or if the expected variations are not present, the user might not be authenticated and an authentication response denying the authentication request may be generated. In some examples, the authentication denial may include a user interface similar to interface 500 shown in FIG. 5. The interface indicates that the user authentication failed and that the call will be terminated. In some examples, the notification may include an executable instruction that, when received by, for instance, internal entity computing device, may be executed and cause the call to be terminated. Interface 500 may also include an option to re-connect to the call and "try again" to authenticate.

Figure 2D:
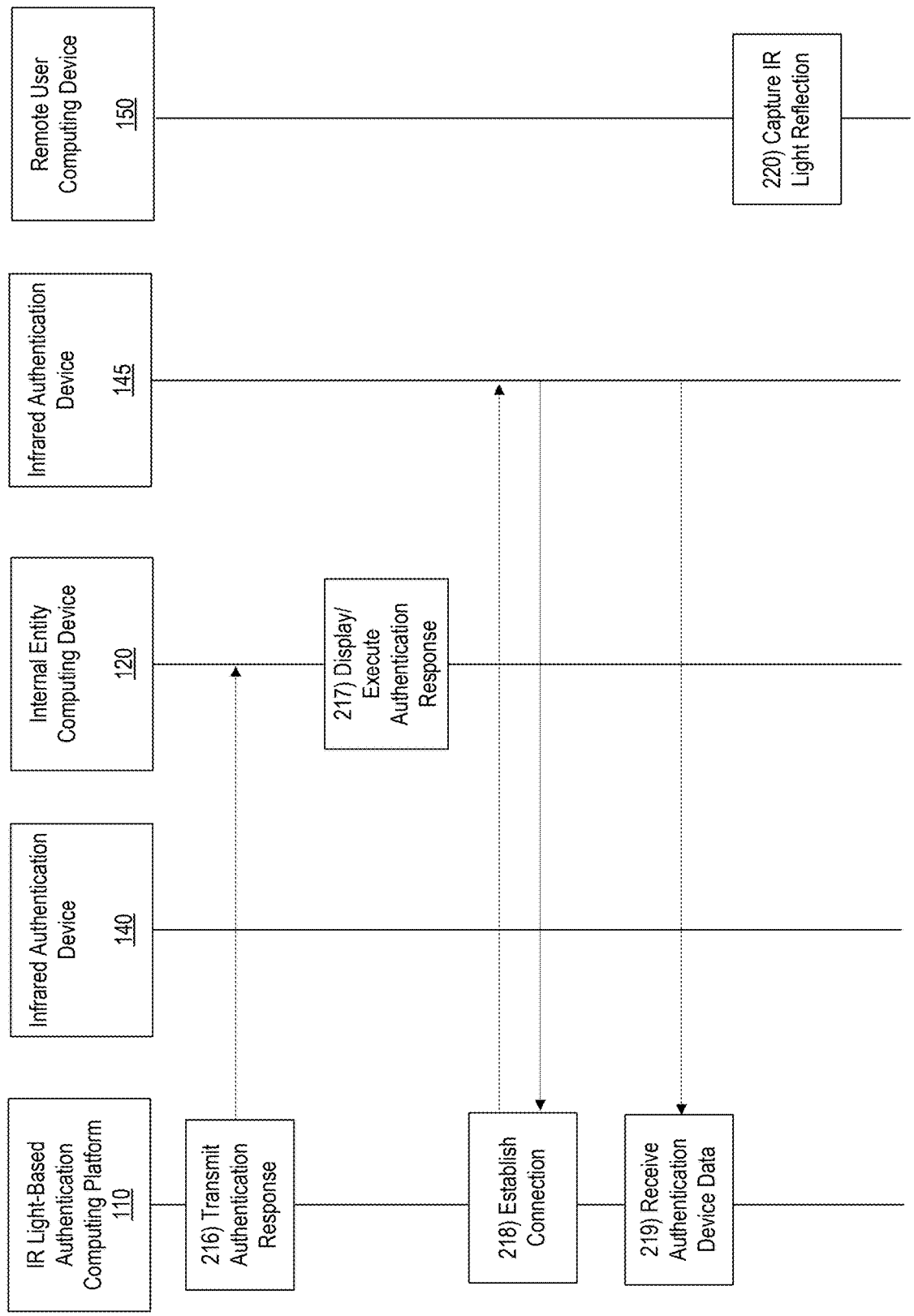

With reference to FIG. 2D, at step 216, IR light-based authentication computing platform 110 may transmit or send the authentication response to the internal entity computing device 120. In some examples, transmitting or sending the authentication response may cause the internal entity computing device 120 to display the authentication response on a display of internal entity computing device 120.

At step 217, internal entity computing device 120 may receive the authentication response and display the user interface and/or execute instructions associated with the response (e.g., call termination if the user is not authenticated).

At step 218, IR light-based authentication computing platform 110 may establish a connection with infrared authentication device 145. For instance, a fourth wireless connection may be established between IR light-based authentication computing platform 110 and infrared authentication device 145. Upon establishing the fourth wireless connection, a communication session may be initiated between IR light-based authentication computing platform 110 and infrared authentication device 145. In some examples, IR light-based authentication computing platform 110 may determine that a connection already exists. If so, an additional connection might not be established.

In some examples, infrared authentication device 145 may be associated with a user associated with remote user computing device 150 (e.g., the other device in the initiated call). Accordingly, the user may use the infrared authentication device 145 to authenticate via the remote user computing device 150.

At step 219, IR light-based authentication computing platform 110 may receive, from the infrared authentication device 145, authentication device data. For instance, IR light-based authentication computing platform 110 may receive an indication of a type of IR light-based authentication being used (e.g., IR light reflected off cornea of user and captured via image capture device, IR light including a code reflected off cornea, or the like). Accordingly, the IR light-based authentication computing platform 110 may receive the indication and initiate authentication functions based on the type of IR light-based authentication being used. In one example, the authentication device data received in step 219 may include a sequential or randomly generated code projected via IR light onto a cornea of a user, reflected off the cornea and captured via an image capture device.

At step 220, remote user computing device 150 may capture the reflected IR light including the code projected via the infrared authentication device 145 onto a user's cornea. For instance, an image capture device 152 of the remote user computing device 150 may include a charge-coupled device configured to capture the reflected image from a cornea of a user receiving a projection of IR light, including a particular code, from the infrared authentication device 145.

Figure 2E:
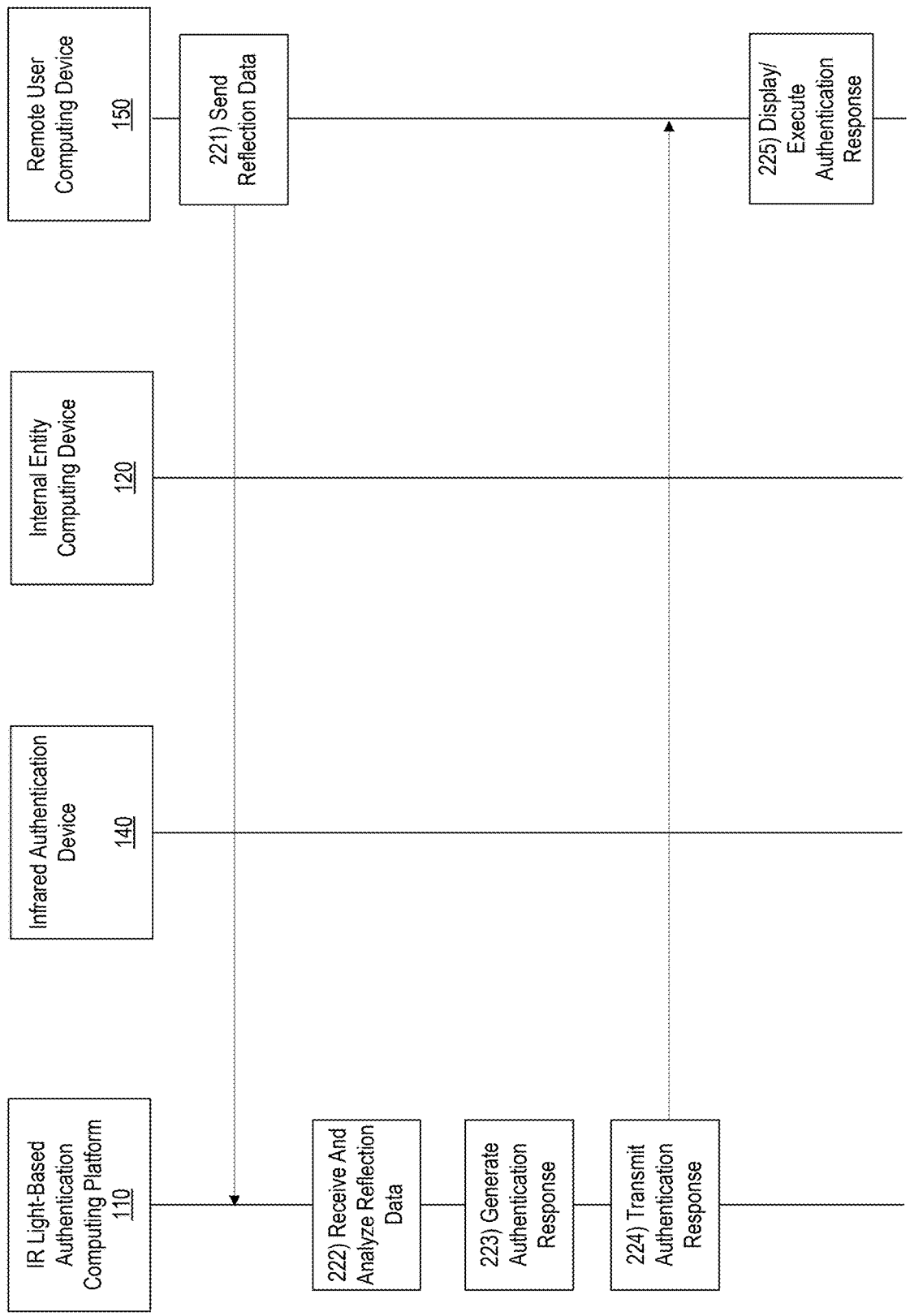

With reference to FIG. 2E, at step 221, remote user computing device 150 may transmit or send the captured reflected IR light (and, e.g., code) to the IR light-based authentication computing platform 110.

At step 222, IR light-based authentication computing platform 110 may receive and analyze the captured reflected IR light and any code captured in the reflected light. For instance, IR light-based authentication computing platform 110 may analyze the captured reflected IR light to determine whether the reflected light includes a code expected based on the authentication data received from infrared authentication device 145. In some examples, the infrared authentication device 145 may include a counter, timer, or other aspect that may be sent to IR light-based authentication computing platform 110 and the IR light-based authentication computing platform 110 may determine whether a reflected code indicates authentication based on whether the reflected code is a sequential code expected to be generated by the infrared authentication device 145 at that time (e.g., based on the counter, timer or other aspect).

In some examples, IR light-based authentication computing platform 110 may further analyze the captured reflected light to determine whether a pattern matches an expected pattern or image (e.g., an image captured during a registration process of a user) and/or to determine whether there are expected variations, depth, or the like, associated with a human cornea (e.g., to confirm that the user is a human user and not an artificial intelligence-based imposter).

At step 223, based on the analyze captured reflected IR light, IR light-based authentication computing platform 110 may generate an authentication response. For instance, if the analysis confirms the user is an actual human user or that the reflected light includes a code that matches an expected code, the user may be authenticated and IR light-based authentication computing platform 110 may generate an authentication response indicating that the user is authenticated and the initiated call may continue. As discussed above, FIG. 4 illustrates one example user interface 400 including an indication that the user was successfully authenticated and the call may continue.

Alternatively, if the reflected image does not include the expected code or if a pattern or expected variations are not present in the captured data, the user might not be authenticated and an authentication response denying the authentication request may be generated. As discussed above, the authentication denial may include a user interface similar to interface 500 shown in FIG. 5. The interface indicates that the user authentication failed and that the call will be terminated. In some examples, the notification may include an executable instruction that, when received by, for instance, internal entity computing device, may be executed and cause the call to be terminated. Interface 500 may also include an option to re-connect to the call and "try again" to authenticate.

As step 224, IR light-based authentication computing platform 110 may transmit or send the authentication response to the remote user computing device 150. In some examples, transmitting or sending the authentication response may cause the remote user computing device to display the authentication response on a display of remote user computing device 150.

At step 225, remote user computing device 150 may receive the authentication response and display the user interface and/or execute instructions associated with the response (e.g., call termination if the user is not authenticated).

Figure 6:
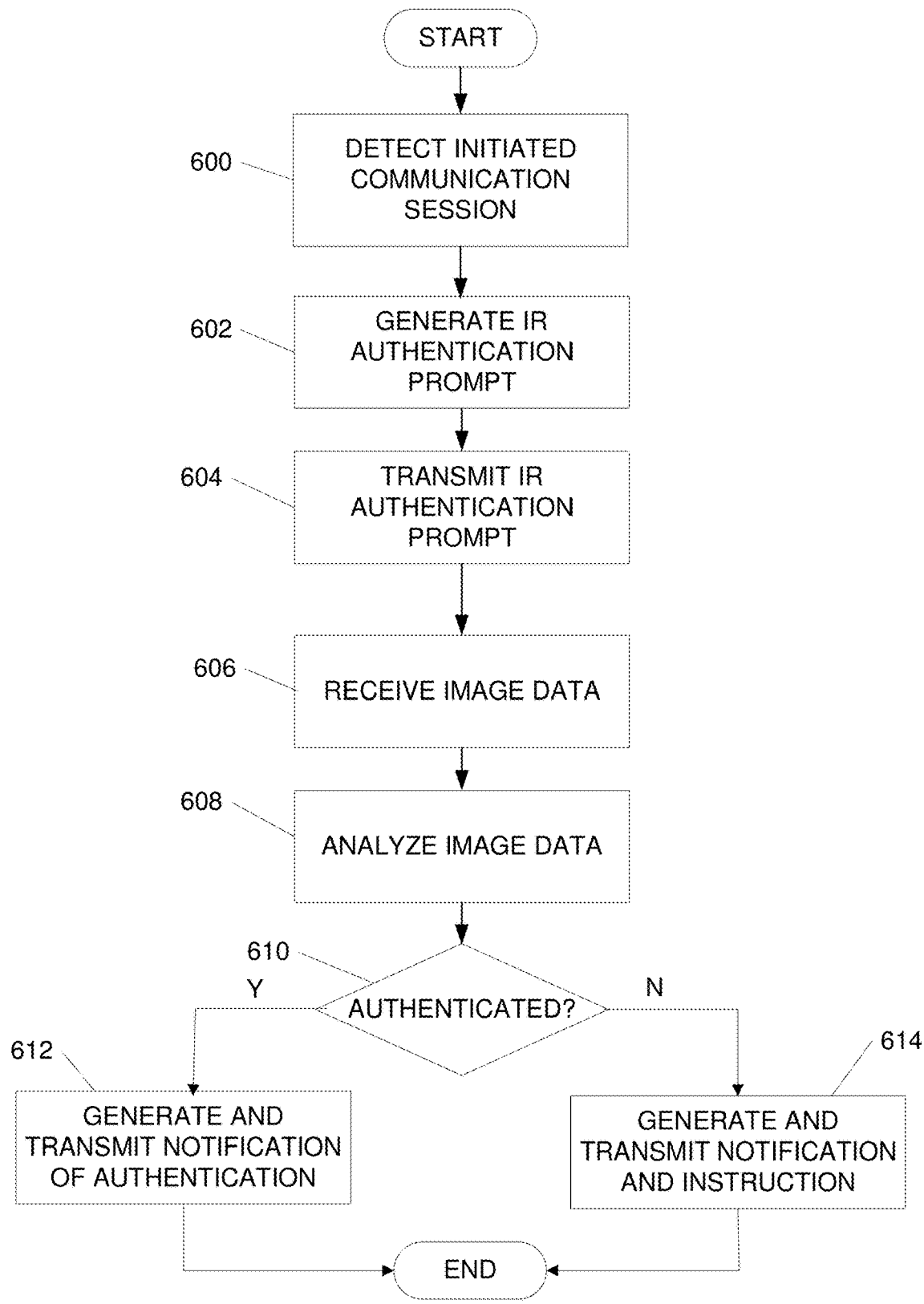
FIG. 6 illustrates an illustrative method for infrared light-based authentication according to one or more aspects described herein.

FIG. 6 is a flow chart illustrating one example method of implementing infrared light-based authentication in accordance with one or more aspects described herein. The processes illustrated in FIG. 6 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 6 may be performed in real-time or near real-time.

At step 600, a computing platform 110 may detect an initiated video communication session. For instance, a computing platform 110 may detect a video communication session, such as a video conference or video call, between two or more computing devices associated with respective users.

At step 602, responsive to detecting the initiated communication session, the computing platform 110 may generate a prompt including instructions to initiate authentication for a user via an infrared authentication device. For instance, the prompt may include instructions to project the infrared light emitted by the infrared authentication device toward an eye of the user in order to capture a reflection of the infrared light for authentication.

At step 604, the computing platform 110 may transmit or send the prompt to at least one computing device of the two or more computing devices associated with the video communication session. In some examples, transmitting or sending the prompt may cause the at least one computing device to display the prompt on a display of the at least one computing device.

At step 606, the computing platform 110 may receive, from the at least one computing device, image data captured by an image capture device of the at least one computing device. In some examples, the image data may include infrared light reflected off a cornea of a user of the at least one computing device based on the infrared light projected toward the eye of the user from the infrared authentication device. In some examples, the infrared light projected toward the cornea may include an authentication code that may be randomly generated, a sequential code, or the like. In some arrangements, the image capture device may be a charge-coupled device.

At step 608, the computing platform 110 may analyze the image data. For instance, the computing platform may analyze the reflected infrared light captured by the image capture device to generate an authentication output based on whether the reflected light matches an expected image (e.g., patterns of reflection of variations in the cornea match expected patterns or variations, a reflected code matches an expected code, or the like). In some examples, analyzing the image data may include receiving, from the infrared authentication device, an expected authentication code and comparing the expected authentication code to the authentication code identified from the reflected infrared light to generate the authentication output.

At step 610, a determination may be made as to whether the authentication output indicates that the user is authenticated. If so, a notification indicating authentication may be generated and transmitted to the at least one computing device at step 612. In some examples, transmitting the notification may cause the notification to be displayed by a display of the at least one computing device.

If, at step 610, the authentication output indicates the user is not authenticated, at step 614, the computing platform may generate and transmit, to the at least one computing device, a notification indicating that the user has not been authenticated and that the communication session will be terminated. In some examples, the notification may include an instruction or command that, when executed by the at least one computing device, may cause termination of the video communication session.

As discussed herein, the arrangements described provide reliable arrangements for authenticating a user and confirming that the user is an actual human user rather than an artificial intelligence reproduction of a user, particularly during video-based communication sessions. In some examples, infrared light may be reflected off an eye or cornea of a user for authentication. The human cornea may be difficult to duplicate via artificial intelligence because corneas as generally unique to the respective person, often don't match each other let alone corneas of other users, have variations due to growth, injury, or the like. Further, corneas as not generally perfectly round or perfectly flat and, accordingly, the reflection would be difficult to reproduce using artificial intelligence.

While various aspects described herein include capturing infrared light reflected off a cornea of a user, the IR light may be reflected off other parts of the human body or face without departing from the invention.

Further, while aspects described herein generally include detection, by the computing platform, of an initiated call in order to prompt the IR light-based authentication, in some examples, a user on the video communication session may request a joining user to authenticate using the arrangements described herein (e.g., instead of a prompt from the computing platform the user may be prompted by another user and may initiate the IR light-based authentication via the infrared authentication device). These arrangements can be used in lieu or in addition to other authentication data or processes (e.g., password, personal identification number, biometrics or the like).

In some examples, the arrangements described herein may be required to be performed prior to entry to a video communication session (e.g., upon attempt to join a video call, the user may be prompted to authenticate using the infrared authentication device). Additionally or alternatively, a user may be permitted to join and may be requested to authenticate using the IR light-based authentication after joining. In some examples, a user may be asked at one or more times during a call to authenticate using the infrared authentication device in order to confirm that the user is still the expected human user and that the user's computing device has not been taken over by another user, by a bot, or the like.

In addition, aspects described herein may be used to verify authenticity of video of a user. For instance, an actual human user may project the IR light onto the cornea at one or more points during a video. Accordingly, if video of that user appears (e.g., on the Internet, social media sites, or the like) and the video does not include the reflected IR light, user may know that the video is not authenticate or that the user in the video is an artificial intelligence generated imposter. The use of the IR light and captured reflection may provide a sort of "fingerprint" to verify authenticity of the video.

Further, as discussed herein, prompts for a user to authenticate using IR light-based authentication may include particular requests. For instance, a user may be instructed to reflect the IR light off a particular body part, a particular eye (e.g., left or right), or the like. In some examples, the arrangements described herein may detect a user wearing glasses and may accommodate for the use of glasses and/or may request the user remove the glasses when performing the authentication process.

Figure 7:
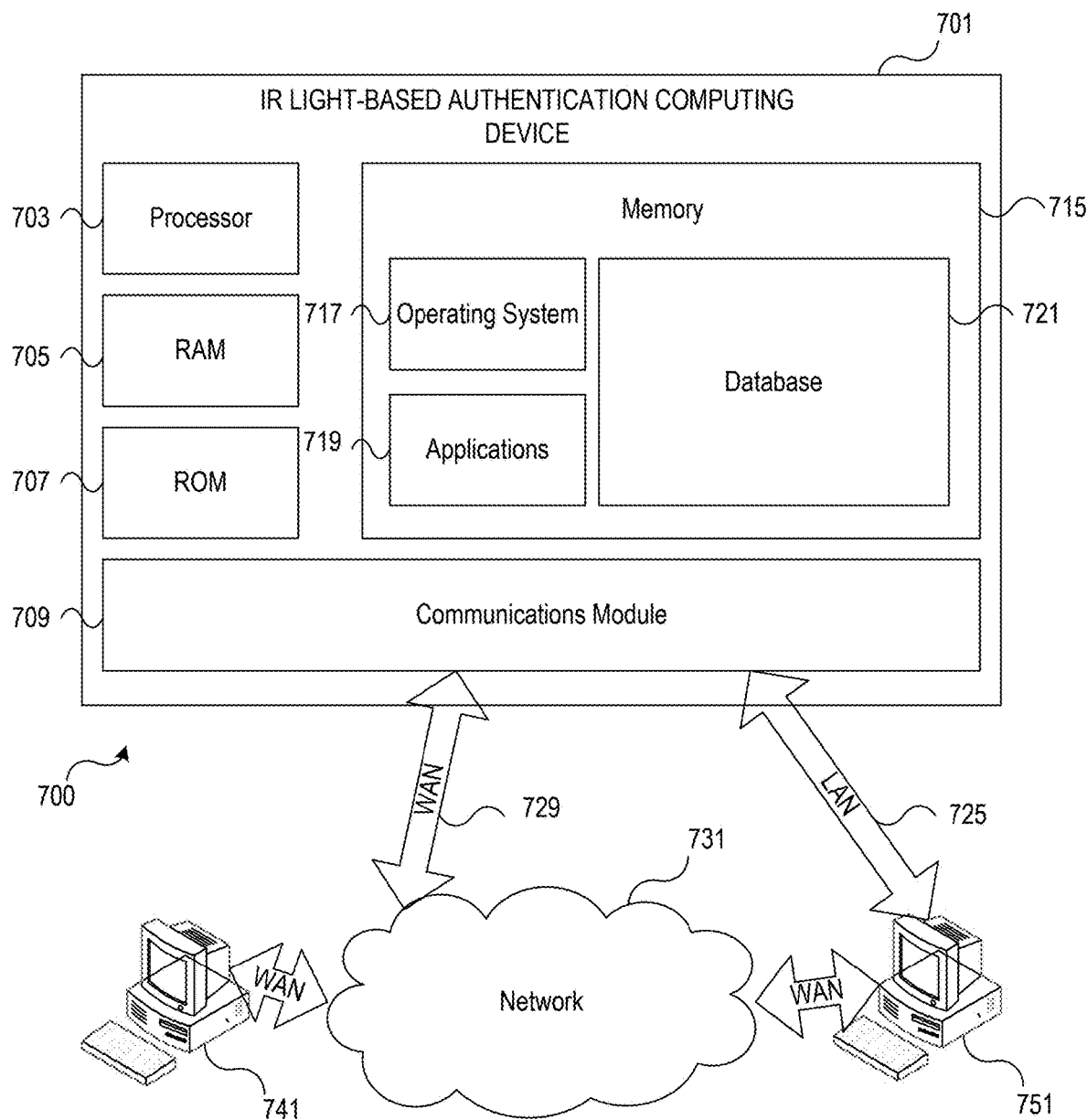
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include IR light-based authentication computing device 701 having processor 703 for controlling overall operation of IR light-based authentication computing device 701 and its associated components, including Random Access Memory (RAM) 705, Read-Only Memory (ROM) 707, communications module 709, and memory 715. IR light-based authentication computing device 701 may include a variety of computer readable media. Computer readable media may be any available media that may be accessed by IR light-based authentication computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by IR light-based authentication computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on IR light-based authentication computing device 701. Such a processor may execute computer-executable instructions stored on a computer-readable medium.

Software may be stored within memory 715 and/or storage to provide instructions to processor 703 for enabling IR light-based authentication computing device 701 to perform various functions as discussed herein. For example, memory 715 may store software used by IR light-based authentication computing device 701, such as operating system 717, application programs 719, and associated database 721. Also, some or all of the computer executable instructions for IR light-based authentication computing device 701 may be embodied in hardware or firmware. Although not shown, RAM 705 may include one or more applications representing the application data stored in RAM 705 while IR light-based authentication computing device 701 is on and corresponding software applications (e.g., software tasks) are running on IR light-based authentication computing device 701.

Communications module 709 may include a microphone, keypad, touch screen, and/or stylus through which a user of IR light-based authentication computing device 701 may provide input, and may also include one or more of a speaker for providing audio output and a video display device for providing textual, audiovisual and/or graphical output. Computing system environment 700 may also include optical scanners (not shown).

IR light-based authentication computing device 701 may operate in a networked environment supporting connections to one or more remote computing devices, such as computing devices 741 and 751. Computing devices 741 and 751 may be personal computing devices or servers that include any or all of the elements described above relative to IR light-based authentication computing device 701.

The network connections depicted in FIG. 7 may include Local Area Network (LAN) 725 and Wide Area Network (WAN) 729, as well as other networks. When used in a LAN networking environment, IR light-based authentication computing device 701 may be connected to LAN 725 through a network interface or adapter in communications module 709. When used in a WAN networking environment, IR light-based authentication computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   detect initiation of a video communication session between two or more computing devices;
   generate a prompt to initiate authentication via an infrared authentication device;
   transmit, to at least one computing device of the two or more computing devices, the generated prompt to initiate authentication via the infrared authentication device;
   receive, from the at least one computing device of the two or more computing devices, image data captured by an image capture device of the at least one computing device of the two or more computing devices, wherein the image data includes infrared light reflected off a cornea of a user associated with the at least one computing device of the two or more computing devices;
   analyze the infrared light reflected off the cornea of the user in the image data to determine whether a pattern matches an expected pattern;
   generate, based on the analyzing, an authentication output based on the infrared light reflected off the cornea of the user associated with the at least one computing device of the two or more computing devices;
   responsive to the authentication output indicating the user is authenticated, transmit a notification to the at least one computing device of the two or more computing devices indicating the initiated video communication session will continue; and responsive to the authentication output indicating the user is not authenticated, transmit, to the at least one computing device of the two or more computing devices:
    a notification indicating that the user is not authenticated and the video communication session will be terminated; and
    an instruction that, when executed by the at least one computing device of the two or more computing devices, causes termination of the initiated video communication session.

2. The computing platform of claim 1, wherein the infrared light reflected off the cornea of the user associated with the at least one computing device of the two or more computing devices is projected onto the cornea from the infrared authentication device.

3. The computing platform of claim 1, wherein the infrared light reflected off the cornea includes an authentication code projected onto the cornea via the infrared authentication device.

4. The computing platform of claim 3, wherein the authentication code is a randomly generated code.

5. The computing platform of claim 3, wherein the authentication code is a sequential code.

6. The computing platform of claim 3, wherein analyzing the infrared light reflected off the cornea of the user in the image data further includes:
    receive, from the infrared authentication device, an expected authentication code; and
    compare the authentication code included in the infrared light reflected off the cornea to the expected authentication code to generate the authentication output.

7. The computing platform of claim 1, wherein the image capture device is a charge-coupled device.

8. The computing platform of claim 1, wherein the infrared authentication device is associated with the user of the at least one computing device of the two or more computing devices and the at least one computing device of the two or more computing devices.

9. A method, comprising:
    detecting, by a computing platform, the computing platform having at least one processor, and memory, initiation of a video communication session between two or more computing devices;
    generating, by the at least one processor, a prompt to initiate authentication via an infrared authentication device;
    transmitting, by the at least one processor and to at least one computing device of the two or more computing devices, the generated prompt to initiate authentication via the infrared authentication device;
    receiving, by the at least one processor and from the at least one computing device of the two or more computing devices, image data captured by an image capture device of the at least one computing device of the two or more computing devices, wherein the image data includes infrared light reflected off a cornea of a user associated with the at least one computing device of the two or more computing devices;
    analyzing, by the at least one processor, the infrared light reflected off the cornea of the user in the image data to determine whether a pattern matches an expected pattern;
    generate, based on the analyzing, an authentication output based on the infrared light reflected off the cornea of the user associated with the at least one computing device of the two or more computing devices;
    responsive to the authentication output indicating the user is authenticated, transmitting, by the at least one processor, a notification to the at least one computing device of the two or more computing devices indicating the initiated video communication session will continue; and
    responsive to the authentication output indicating the user is not authenticated, transmitting, by the at least one processor and to the at least one computing device of the two or more computing devices:
        a notification indicating that the user is not authenticated and the video communication session will be terminated; and
        an instruction that, when executed by the at least one computing device of the two or more computing devices, causes termination of the initiated video communication session.

10. The method of claim 9, wherein the infrared light reflected off the cornea of the user associated with the at least one computing device of the two or more computing devices is projected onto the cornea from the infrared authentication device.

11. The method of claim 9, wherein the infrared light reflected off the cornea includes an authentication code projected onto the cornea via the infrared authentication device.

12. The method of claim 11, wherein the authentication code is a randomly generated code.

13. The method of claim 11, wherein the authentication code is a sequential code.

14. The method of claim 11, wherein analyzing the infrared light reflected off the cornea of the user in the image data to further includes:
    receiving, by the at least one processor and from the infrared authentication device, an expected authentication code; and
    comparing, by the at least one processor, the authentication code included in the infrared light reflected off the cornea to the expected authentication code to generate the authentication output.

15. The method of claim 9, wherein the image capture device is a charge-coupled device.

16. The method of claim 9, wherein the infrared authentication device is associated with the user of the at least one computing device of the two or more computing devices and the at least one computing device of the two or more computing devices.

17. One or more non-transitory computer-readable media storing instructions that, when executed by a computing platform comprising at least one processor, memory, and a communication interface, cause the computing platform to:
    detect initiation of a video communication session between two or more computing devices;
    generate a prompt to initiate authentication via an infrared authentication device;
    transmit, to at least one computing device of the two or more computing devices, the generated prompt to initiate authentication via the infrared authentication device;
    receive, from the at least one computing device of the two or more computing devices, image data captured by an image capture device of the at least one computing device of the two or more computing devices, wherein the image data includes infrared light reflected off a cornea of a user associated with the at least one computing device of the two or more computing devices;

analyze the infrared light reflected off the cornea of the user in the image data to determine whether a pattern matches an expected pattern;

generate, based on the analyzing, an authentication output based on the infrared light reflected off the cornea of the user associated with the at least one computing device of the two or more computing devices;

responsive to the authentication output indicating the user is authenticated, transmit a notification to the at least one computing device of the two or more computing devices indicating the initiated video communication session will continue; and responsive to the authentication output indicating the user is not authenticated, transmit, to the at least one computing device of the two or more computing devices:
- a notification indicating that the user is not authenticated and the video communication session will be terminated; and
- an instruction that, when executed by the at least one computing device of the two or more computing devices, causes termination of the initiated video communication session.

18. The one or more non-transitory computer-readable media of claim 17, wherein the infrared light reflected off the cornea of the user associated with the at least one computing device of the two or more computing devices is projected onto the cornea from the infrared authentication device.

19. The one or more non-transitory computer-readable media of claim 17, wherein the infrared light reflected off the cornea includes an authentication code projected onto the cornea via the infrared authentication device.

20. The one or more non-transitory computer-readable media of claim 19, wherein analyzing the infrared light reflected off the cornea of the user in the image data further includes:

receive, from the infrared authentication device, an expected authentication code; and compare the authentication code included in the infrared light reflected off the cornea to the expected authentication code to generate the authentication output.

* * * * *